United States Patent [19]

Davis

[11] Patent Number: 4,597,971

[45] Date of Patent: * Jul. 1, 1986

[54] SOFT CREAM CHEESE PRODUCT

[75] Inventor: Loren L. Davis, Vernon Hills, Ill.

[73] Assignee: Kraft, Inc., Glenview, Ill.

[ * ] Notice: The portion of the term of this patent subsequent to Apr. 13, 1999 has been disclaimed.

[21] Appl. No.: 521,631

[22] Filed: Aug. 9, 1983

Related U.S. Application Data

[63] Continuation-in-part of Ser. No. 66,613, Aug. 15, 1979, Pat. No. 4,324,804, and Ser. No. 251,046, Apr. 6, 1981, abandoned.

[51] Int. Cl.$^4$ .................. A23C 19/076; A23C 19/09; A23C 20/00
[52] U.S. Cl. ..................................... 426/36; 426/40; 426/582
[58] Field of Search ................... 426/36, 39, 40, 582

[56] References Cited

U.S. PATENT DOCUMENTS 2,387,276 10/1945 Link ........................................ 426/36
3,929,892 12/1975 Hynes et al. ...................... 426/36 X
4,244,983 1/1981 Baker ................................ 426/39 X
4,328,804 4/1982 Davis .................................... 426/36

OTHER PUBLICATIONS

Kosikowski, F., Cheese and Fermented Milk Foods, Distributed by Edwards Brothers, Inc., Ann Arbor, Mich., 1966, pp. 122–134.
Sanders G. P., Cheese Varieties and Descriptions, USDA Handbook No. 54, 1953, p. 36.

*Primary Examiner*—David M. Naff
*Attorney, Agent, or Firm*—Fitch, Even, Tabin & Flannery

[57] ABSTRACT

A soft bodied cream cheese product which is readily spreadable at refrigeration temperatures is prepared by blending a cultured cream cheese dressing mix having substantially unhomogenized milkfat with a firm bodied cream cheese curd having homogenized milkfat. The cream cheese product contains by weight a milkfat content of at least about 33 percent and a moisture content not exceeding about 55 percent.

4 Claims, 1 Drawing Figure

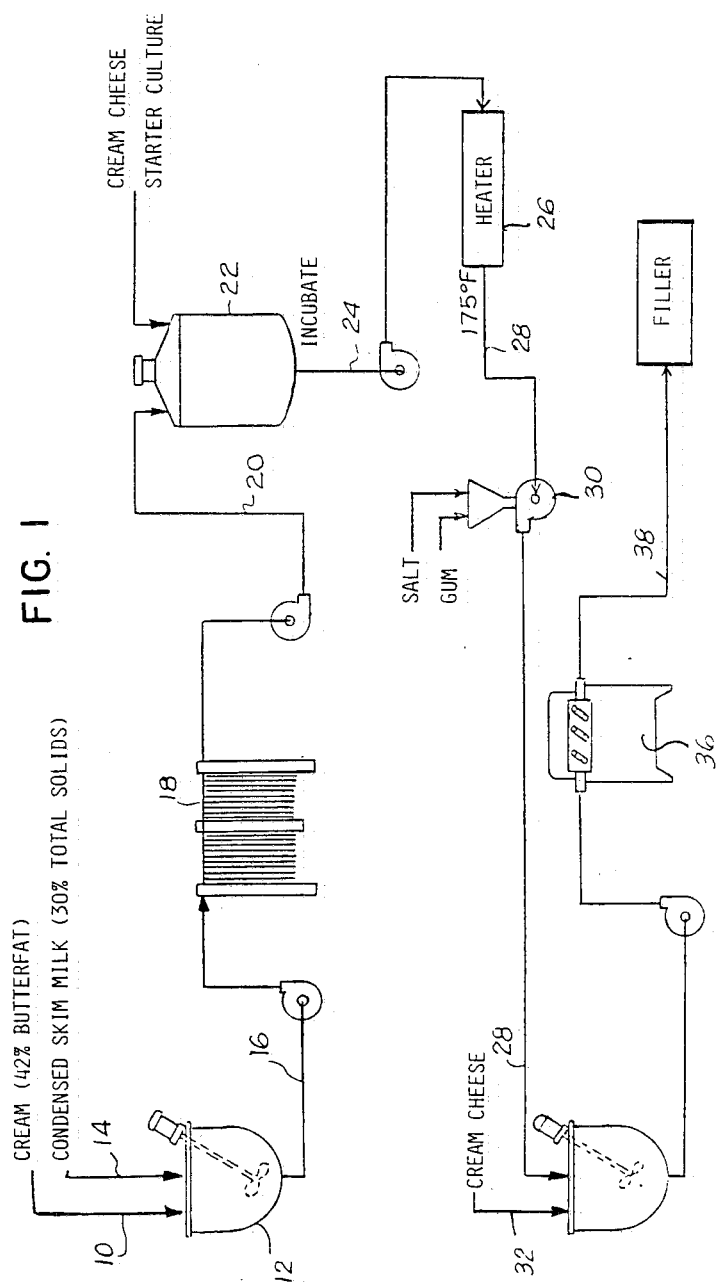

SOFT CREAM CHEESE PRODUCT

This application is a continuation in part of application Ser. No. 66,613 filed Aug. 15, 1979, now U.S. Pat. No. 4,324,804, and application Ser. No. 251,046 filed Apr. 6, 1981 which is now abandoned.

The present invention relates generally to a method for the manufacture of cream cheese and to cream cheese products. More particularly, the present invention is directed to methods for manufacturing cream cheese to provide a cream cheese product with a soft spreadable texture and body at refrigeration temperatures, and to the soft bodied cream cheese product thereby provided.

Cream cheese is a mild, acid-coagulated uncured cheese made of dairy components including cream, such as a mixture of cream and milk. Cream cheese is normally stored under refrigeration conditions and the body of cream cheese is conventionally smooth and butterlike. By refrigeration temperatures is meant a temperature in the range of from 32° F. to 45° F., as would normally be found in a home refrigerator. The texture and body of cream cheese at refrigeration temperature is typically firm, such that the cream cheese can be sliced, but is not soft or readily spreadable under such temperature conditions, and cannot readily be applied to a soft or brittle substrate.

In making cream cheese, sweet whole milk and/or skim milk and sweet cream are blended in preselected proportions to form a cream cheese mix. The cream cheese mix normally has a butterfat content of from about 10% to about 14% but may have a butterfat content of from about 7% to about 20%. In accordance with the Federal Standards of Identity, after processing, the finished cream cheese product should have a butterfat content of at least about 33% by weight of the product, and a total milk solids content of at least about 45% by weight corresponding to the presence of not more than 55% by weight moisture in the cream cheese product.

The cream cheese mix is conventionally pasteurized and homogenized, after which it is cooled, usually to a temperature between 62° F. and 90° F. and is then inoculated with a lactic acid culture. Rennet may be used to aid the coagulation of the mix. The mix is held at the inoculation temperature until it has ripened and a coagululum is formed. The acidity of the coagulum may conventionally be provided at a level of from about 0.6 percent to about 0.9 percent (calculated as percent equivalent lactic acid).

After the desired acidity is obtained, the curd is separated from the whey and is thereafter packaged. Several methods are known for separation of curd from whey. One method for separation of curd from whey is to dip the curd in a bag from the vat in which the coagulum is formed. The curd is permitted to remain in the bag until the whey is drained. Another known process for making cream cheese and separating cream cheese curd from whey includes a mechanical separation of the curd. This process is disclosed in U.S. Pat. No. 2,387,276 to Link, issued Oct. 23, 1945. In accordance with the method of this patent, after the mix is ripened to form a coagulum, the coagulum is heated to an elevated temperature to break the viscosity of the mix. Thereafter the heated mix is centrifuged at the elevated temperature to separate the curd from the whey.

The body and texture of conventional cream cheese is suitable for most retail consumer use. However, conventional cream cheese has a relatively firm body under refrigeration conditions which is disadvantageous for a number of potential uses for cream cheese products, and substantial effort has been devoted to the provision of soft cream cheese products, such as by mechanical breaking of the cream cheese product at refrigeration temperatures, which required maintaining the product at refrigeration temperatures throughout packaging in order to retain the softer texture. However, while "cold pack" packaging methods in which the product is wrapped in foil, may be utilized with firm bodied cream cheese products, difficulties are encountered in respect of keeping quality of cold packed soft cream cheese products. Improved keeping quality may be provided by "hot packing" procedures in which containers are filled at elevated temperature conditions, but hot packing processing conditions increase the firmness of the cream cheese product. In this connection, it would be desirable to provide cream cheese products which have physical properties in respect to soft, spreadable body and texture which are more suitable at refrigeration temperatures for use as dips, spreads and similar applications, but which have the flavor and constituent components of cream cheese in accordance with the Federal Standards of Identity. The provision of soft cream cheese products has presented difficulties in the prior art, particularly in view of the relatively high butterfat component of cream cheese.

The present invention is specifically directed to providing a cream cheese product which has a soft, spreadable consistency at refrigeration temperatures.

Accordingly, the principal object of the present invention is to provide a cream cheese product which has a spreadable consistency at refrigeration temperatures. A further object of the present invention is to provide a cost effective method for manufacturing a soft, spreadable cream cheese product which may include hot packing of the cream cheese product in suitable consumer size containers.

These and other objects of the invention will become apparent from consideration of the following detailed description and the accompanying drawing, of which:

FIG. 1 is a schematic flow chart illustrating the processing steps carried out in an embodiment of the present invention.

Generally in accordance with the present invention, a soft bodied cream cheese product which is spreadable at refrigeration temperatures comprising a uniform blend of a cultured cream cheese dressing mix product and a firm cream cheese curd product having specified characteristics. In this connection, the soft bodied cream cheese product of the present invention comprises from about 25 percent to about 75 percent by weight of a cultured cream cheese dressing mix itself comprising at least about 30 percent by weight of substantially unhomogenized milkfat based on the weight of the dressing mix. The cultured cream cheese dressing mix further comprises at least about 40 percent and preferably at least about 45 percent by weight of total dairy solids. Furthermore, the cultured dressing mix comprises not more than about 60 percent and preferably not more than 55 percent moisture, based on the weight of said dressing mix. The soft, spreadable cream cheese product further comprises from about 25 percent to about 75 percent by weight of a firm bodied cream cheese curd product itself comprising at least about 30 percent, and preferably at least about 33 percent, by weight of the homogenized milkfat, at least about 40 percent, and preferably at least about 45 percent by weight of dairy solids, and not more than about 60 percent, and preferably not more than about 55 percent by weight moisture based on the weight of the firm bodied cream cheese curd product. The cultured cream cheese dressing mix component and said firm bodied cream cheese curd component respectively have appropriate predetermined milkfat and moisture content and are combined in proportions to provide the blended soft bodied cream cheese product with a milkfat content of at least about 33 percent by weight, and a moisture content not exceeding about 55 percent by weight based on the weight of the soft bodied cream cheese product. It is particularly advantageous to provide cream cheese dressing mix and firm bodied cream cheese curd components each having at least 33 percent milkfat and not more than 55 percent moisture and to blend these components in substantially equal weight proportions in the final soft bodied product. As indicated, the soft bodied cream cheese has a readily spreadable consistency at refrigeration temperatures and in this connection, should have a spreadability at 45° F. corresponding to an initial Haake yield value of less than about 2500, and preferably less than about 2000, as will be discussed in more detail hereinafter.

Furthermore, as indicated, the soft bodied cream cheese comprises both homogenized and substantially unhomogenized milkfat components which may be distinguished by centrifugal centrifugation technique, and in this regard, the soft bodied cream cheese blend should have a centrifugally separable milkfat component which comprises at least about 75 percent of the total milkfat content of the soft bodied cream cheese.

The present invention is also directed to methods for manufacturing a soft bodied cream cheese product which is spreadable at refrigeration temperatures. In accordance with method aspects of the present invention, a cream cheese dairy mix is provided comprising at least about 30 percent and preferably at least about 33 percent by weight of substantially unhomogenized milkfat, at least about 40 percent and preferably at least about 45 percent total dairy solids and not more than about 60 percent and preferably not more than about 55 percent moisture based on the weight of the mix. Further in accordance with the method, the mix is pasteurized and the pasteurized mix is cultured to provide a cultured cream cheese dressing mix having a pH of about 5.2 or less.

Further in accordance with the method, the cultured dressing mix is blended with a firm bodied cream cheese curd product comprising at least 30 percent and preferably at least about 33 percent by weight of homogenized milkfat, and not more than about 60 percent and preferably not more than about 55 percent by weight moisture, based on the weight of the firm bodied cream cheese curd product. The cultured cream cheese dressing mix may be uniformly blended with the firm bodied cream cheese curd product, as previously indicated, in a respective weight ratio in the range of 3:1 to 1:3, preferably 2:1 to 1:2, and most desirably in substantially equal weight amounts, to provide a substantially uniform blend comprising at least about 33 percent milkfat and not more than about 55 percent by weight moisture based on the weight of the blend. The blend may be subsequently packaged at an elevated temperature of at least about 150° F., and most preferably at least about 155° F. to provide a packaged soft spreadable cream cheese product having a readily spreadable consistency at refrigeration temperature.

The cultured unhomogenized cream cheese dressing mix is blended with firm bodied cream cheese curd made in accordance with a firm bodied cream cheese procedure using homogenized cream cheese mix constituents. The blend is then mixed together in a suitable manner to provide a homogenous cream cheese product. As indicated, a portion of the soft cream cheese product is provided in accordance with a conventional firm bodied cream cheese make procedure. In this regard, in the preparation of firm bodied cream cheese curd product in accordance with the art, a cream cheese mix is provided which, after culturing and separation of whey, will provide the desired cream cheese components at desired levels. A conventional cream cheese mix useful for the present invention has butterfat present at a level of from about 10 to about 12 percent. The cream cheese mix may be made from cream or a mixture of cream and milk or a mixture of cream, milk and partially skimmed milk or skim milk solids in accordance with conventional practice. The cream cheese mix may have non-fat mix solids present at a level of from about 6 to about 8 percent by weight.

The cream cheese mix may be homogenized, pasteurized and cooled to a temperature in the range of about 70° F. to 78° F. prior to inoculation with the lactic acid culture. The cream cheese mix may be permitted to ferment for a period of about 14–18 hours, at which time a coagulum forms. The coagulum is stirred until it is smooth. Thereafter, the coagulum may be heated to break the coagulum and provide a cream cheese curd and whey mixture which is suitable for separation by centrifugal separators or by bag draining. Generally, the coagulum is heated to a temperature of from about 170° F. to about 185° F. Upon separation a conventional cream cheese product is provided which has a firm body, and which has a very finely divided milkfat component. In this regard, the size distribution of the milkfat component will generally correspond to the conventional size distribution of the homogenized fat component of the ingredient components and may have a distribution such that at least 80 percent and preferably at least 90 percent by weight of the fat particles have a diameter of about 1 micron or less, although the mean particle size (which is difficult to measure) may also be somewhat larger (e.g. between 1 and 2 microns) in conventional homogenized firm bodied cream cheese. This firm cream cheese product forms a component of the soft cream cheese product of the present invention together with a soft cream cheese dressing component which will now be described in more detail.

In accordance with the present invention, a component of the soft cream cheese product is prepared by utilizing cream cheese ingredient components having a substantially unhomogenized fat component. By substantially unhomogenized is meant that the milkfat has a product history of not having been subjected to shear conditions exceeding that provided by low-pressure homogenization at 500 psi or less, single stage. In this regard, the fat component should have a size distribution such that at least 80 percent by weight of the milkfat has a particle size greater than 1 micron in diameter. Generally, natural cream may have a butterfat component having a particle size distribution peaking at about 3.5 microns, and at least 90 percent of the fat globules of natural sweet cream may typically have a particle size diameter greater than about 0.6 microns.

The cultured cream cheese dressing mix component may be provided from a mixture of cream cheese dairy mix components such as sweet cream, condensed skim milk, and/or reconstituted nonfat milk solids. The mixture has fat, solids and moisture content which generally is desired in the finished cultured cream cheese dressing mix, and there is no whey separation step after culturing. Accordingly, the milkfat and solids content for the initial components for preparation of the cultured dressing mix will generally be higher than that used in the manufacture of the firm bodied cream cheese, which does include a whey separation step. As indicated, the mixture is substantially unhomogenized prior to culturing, but should be pasteurized. After culturing the mixture is broken with agitators, heated and blended with other desired ingredients, such as salt and stabilizers such as carob bean gum.

The cultured unhomogenized cream cheese dressing mixture thereby produced is blended with the firm bodied cream cheese curd to provide a uniform mixture, such as by being mixed and homogenized at low pressure (500 psig), single stage. High pressure homogenization should not be utilized, as it will disadvantageously affect the particle size distribution of the blended mixture, and adversely affect the soft spreadable texture of the product.

The blended, substantially homogenous mixture of the cream cheese dressing mix and the firm bodied cream cheese may be hot filled into containers at an elevated temperature of at least 150° F. to provide a soft cream cheese product which has a soft spreadable texture at refrigeration temperatures. The product should best be packaged at a temperature of at least about 155° F. in order to provide excellent keeping qualities to the product. The provision of a soft spreadable texture at refrigeration temperatures, despite the hot packing conditions is an important aspect of the invention.

Turning now to the drawing, the present invention will now be more particularly described with respect to the specific embodiment of the method of preparation schematically illustrated in FIG. 1. In accordance with the process flow of the embodiment illustrated in FIG. 1, a soft cultured cream dressing component is prepared from a natural, unhomogenized cream ingredient 10 having a natural milkfat content of 42 percent by weight, which milkfat component is predominantly in the form of fat globules and has a natural fat globule particle size distribution. The cream component 10 is introduced into a blender 12, together with a skim milk ingredient 14 having a total solids content of about 30 percent by weight, such as condensed skim milk or nonfat dry milk solids reconstituted to the appropriate level with water. The cream and skim milk components 10, 14 are mixed together in the blender 12 in appropriate proportions to provide a cream cheese dressing mix 16 having substantially the total solids content and the butterfat level desired in both the final cultured cream cheese dressing and the soft cream cheese product to be produced by the manufacturing procedure. Other mixes containing cream, whole milk, condensed skim milk and/or nonfat dry milk powder may be utilized in a similar manner depending on availability and cost considerations, in accordance with conventional practice, provided the high milkfat and solids levels are utilized. The resulting blended cream cheese dressing mix 16 is pasteurized by pumping the mixture through pasteurizer 18 at appropriate time and temperature conditions such as a temperature of about 175° F. for about 17 seconds. The resulting pasteurized blend 20 may be subsequently cooled to ambient temperature, and pumped to an incubation tank 22 such as a cold wall storage tank, for culturing of the mixture. In this regard, the pasteurized cream cheese dressing mix provided in the storage tank 22 is cultured by adding a cream cheese starter culture such as a conventional cream cheese starter culture which may be added to the mixture to be cultured at a level determined by the incubation period and temperature to start the fermentation, to produce an acid curd, and to develop a desirable aromatic cream cheese flavor. The cream cheese starter culture may desirably be added with appropriate mixing, for example, at a level of about 1 percent by weight based on the weight of the mixture to be cultured, and the inoculated mixture may then be allowed to ripen in a quiescent state until a desired level of acidity is achieved, such as for a period of 8–13 hours or until a desired pH level, such as a pH in the range of pH 4.5 to pH 5.1, and preferably about pH 4.9 is attained.

Upon completion of the fermentation, a cultured cream cheese dressing mix is provided in the tank 22 having a total solids content and butterfat content substantially corresponding to that of the initial ingredients. Furthermore, the soft cultured dressing mixture thereby produced, which has not undergone substantial homogenization or similar high shear processing step, has a milkfat particle size distribution substantially corresponding to that of the initial components, and includes both the curd and whey components of the cultured materials.

In accordance with the illustrated process embodiment, the resulting fermented cream cheese dressing mixture product is broken by means of agitators in the tank 22, to provide a cultured cream cheese dressing mixture 24 which is heated to facilitate subsequent processing such as incorporation of various other components, and to provide a heated product for subsequent hot filling package operations. In this connection, in the illustrated embodiment, the cultured cream cheese dressing 24 may be heated to a temperature in the range of about 165°–170° F. by pumping the mix 24 through a swept surface heater 26. Appropriate levels of conventional cream cheese components such as salt and stabilizer (e.g., carob bean gum) may be incorporated into the heated dressing component 28 if desired, by appropriate blending apparatus 30.

Further in accordance with the illustrated method embodiment, the heated, cream cheese dressing mixture is combined with a firm bodied cultured cream cheese curd component 32 prepared from ingredients including homogenized milkfat constituents. In this regard, the firm bodied cream cheese component in the illustrated method embodiment may be provided by means of a conventional make procedure in which dairy products such as whole milk and cream may be blended to achieve a cream cheese mixture blend having a butterfat content in the range of from about 10 to about 12 percent by weight, and a total dairy solids content of about 18 percent by weight, and the blend may be pasteurized in accordance with conventional procedures. The pasteurized blend may be homogenized under high shear conditions such as corresponding or equivalent to a homogenization pressure of at least 1600 psi (e.g., 2000 psi) double stage to provide for a substantial diminution of the fat particle size which is a favorable factor in respect of production yield of cream cheese but which provides a firm body to the product. The homogenized mixture has a finely divided milkfat component. The homogenized blend may be cooled to an ambient temperature (e.g., 70° F.), inoculated with cream cheese starter culture and allowed to ripen in a quiescent state for about 14–18 hours, or until a pH in the range of about 4.3 to 4.6 is reached. The resulting curd may then be broken, the curd and whey of the broken mixture heated to a temperature of 170°–185° F., and the curd and whey separated by centrifugation as generally described in the above referred to Link patent. The resulting separated curd is a firm bodied cream cheese product having a milkfat content of at least about 33 percent by weight and a total dairy solids content of at least about 45 percent by weight of the product. The firm bodied cream cheese product is not readily spreadable at refrigeration temperature, and has an increased firmness when packaged under "hot pack" conditions as opposed to "cold pack" conditions. The firm cream cheese product is believed to have a fat component substantially corresponding in particle size distribution to the distribution of the homogenized mix prior to culturing of the mix.

In the illustrated embodiment, the finished cultured dressing mixture 28 and the firm bodied cream cheese component 32 each have a milkfat content of at least 33 percent by weight and each contain not more than 55 percent moisture, and accordingly meet the Federal Standards of Identity in respect of butterfat content and moisture level. The components 28, 32, are blended together in a ratio of from about 2:1 to about 1:2 and preferably about 1:1 of creaming mixture 28 to firm cream cheese mixture 32 to provide a soft cream cheese which is spreadable at refrigeration temperature and which is believed to have a very broad or bimodally distributed fat component particle size distribution comprising a finely divided fat component predominantly derived from the homogenized fat constituent of the firm homogenized cream cheese curd material 32, and a relatively large particle size fat component predominantly derived from the substantially unhomogenized fat constituent of the cultured dressing mixture 28. The broad, or bimodal fat distribution is believed to contribute substantially to the desired soft bodied texture of the resulting cream cheese product at refrigeration temperature. As indicated, the cultured dressing mix 28 and the firm bodied cream cheese are blended together and in this regard may desirably be blended together in appropriate blending apparatus 34 (such as a Grace Blender, or a Pfaudler or Groen cooking apparatus). The blended material should desirably be maintained at an elevated temperature during blending such as at least about 155° F. corresponding to the minimum filling temperature to be utilized in packaging of the cream cheese product. The intimate and uniform mixing of the two principal components 28, 32 may be facilitated by low pressure homogenization or other similar low shear mixing procedures, such as by pumping the blended cream cheese components 28, 32 from the blending apparatus 34 through a low pressure homogenization apparatus 36, for example under homogenization conditions of about 500 psi, or somewhat higher, single stage. Such treatment may shift the particle size distribution peak of the unhomogenized fat component toward a smaller particle size, but should maintain a broad or bimodal fat component distribution in the intimately mixed product.

The blended, intimately mixed blend 38 is conducted at an elevated temperature to a "hot pack" filling station 40, which may be a conventional hot pack filling apparatus such as a hot pack filler manufactured by Ben-Hil Auto-Pack Company, and other manufacturers, and is subsequently packaged at elevated temperature conditions suitable for providing superior keeping quality and extended shelf life.

Having generally described the embodiment of the method illustrated in FIG. 1, that method will now be more particularly described with respect to a specific example of the application of the method. The example further illustrates various features of the present invention but is not intended to limit the scope of the invention which is defined in the appended claims.

EXAMPLE

A soft cream cheese dressing component was made on a plant run scale by blending 2000 pounds of unhomogenized sweet cream, nonfat dry milk and water to provide a mix having 34.3 weight percent milkfat, and 45.4 percent by weight total solids. This mixture was pasteurized at 178° F. for 17 seconds, cooled to 72° F. and pumped to a processing tank, without homogenization. The mixture was inoculated with 20 pounds of commercially available B-4 H-56 cream cheese starter culture supplied by Hansen's Laboratories, and was allowed to ripen in a quiescent state for 10 hours at which point a pH of 4.90 was reached. The cultured cream cheese dressing product thus produced was broken by agitation, and 1500 pounds of the cultured dressing mixture was heated to 170° F. through a swept surface heater and pumped to a blender. Fifteen pounds of a 75 percent by weight salt (NaCl) and 25 percent by weight carob bean gum mixture were added to the heated cultured dressing mixture immediately after the heating step. In this manner, a salted cultured cream cheese dressing component was provided having an unhomogenized fat component. The cultured cream cheese dressing component undergoes no substantial whey separation step, and substantially retains the initial milkfat, moisture and total solids components of the initial ingredients. 1500 pounds of this cultured cream cheese dressing mixture and 1500 pounds of a firm bodied cream cheese product meeting the Federal Standards of Identity for cream cheese, which was prepared from homogenized milkfat components (2000 psi, double stage) as generally previously described and which had undergone a centrifugal curd separation step in accordance with conventional practice, were blended together. The blend was pumped to a surge kettle and jacket heat was used to bring the product temperature up to about 163° F. The heated blend was then homogenized at 500 psi single stage and pumped to a blender provided with jacket heat to maintain temperature with minimum agitation to avoid oiling off of the product. The blended product was subsequently pumped to a Ben-Hil filler, and was filled in polypropylene plastic cups, topped with a foil membrane, and snap-on plastic lid. Filler temperatures ranged from 153° F. to 155° F. The finished product analysis was as follows in percent by weight:

| | |
|---|---|
| Moisture | 54.00 |
| Milkfat | 34.20 |
| pH | 4.70 |
| Salt | 0.90 |

-continued

| Protein | 5.60 |
|---------|------|

The product body was spreadable at refrigeration temperatures, and flavor was judged to be very acceptable by a taste panel. The product has excellent shelf life of at least 120 days. Samples of the soft cream cheese product are submitted to physical-chemical analysis.

The product has a soft consistency similar in some respects to a jelly product, and may be analyzed by means of standard jelly evaluation techniques and apparatus such as the Haake Yield Value technique in which a standard rotor is immersed in the product to be evaluated and the torque required to initiate rotation of the rotor is measured. Accordingly, four samples (Samples S1, S2, S3 and S4) of the product are subjected to textural evaluation using a standard Haake VT 24 viscometer fitted with a standard jelly rotor. The torque initially required (at "zero seconds" time) to turn the standard jelly rotor, which is referred to herein as the Haake Yield Value, is determined. The initial yield value at zero seconds is regarded to be a measure of the spreadability of the product. Three readings were taken on each of the four samples of the soft cream cheese product and the average value of the three measurements for each sample is calculated. The average "yield values" (zero time readings) for the soft cream cheese product were about 1850 units at 45° F., as set forth in the following table:

TABLE

| S1 Average | S2 Average | S3 Average | S4 Average | Total Average |
|------------|------------|------------|------------|---------------|
| 1787 | 1953 | 1857 | 1780 | 1844 ± 80 |

The standard viscometer (Haake VT 24) and standard jelly rotor which were used to evaluate the soft cream cheese samples is not suitable for textural evaluation of conventional firm bodied cream cheese and product manufactured from a homogenized cream cheese mix, in view of the firmness of the product at refrigeration temperatures, and a smaller rotor would be required for use of the instrument.

The soft cream cheese product may also be analyzed by modified Mojonnier test to determine the milkfat size distribution. While not being bound to any theory, it is believed that the broad or bimodal fat globule particle size distribution of the product is a particular factor contributing to the spreadable character of the product. Soft cream cheese products in accordance with the present invention generally have a higher proportion of centrifugally separable milkfat than the conventional cream cheese curd product such as utilized as a component in its manufacture. The presence of increased concentrations of lactose and serum proteins over conventional cream cheese curd products (by virtue of the absence of a whey removal step from the cultured dressing mix) may also be factors in the provision of a soft texture. The presence of increased concentrations of lactose and serum proteins over conventional cream cheese curd products (by virtue of the absence of a whey removal step from the cultured dressing mix) may also be factors in the provision of a soft texture.

In homogenized milk products, the fat globules are mechanically reduced in size, while in unhomogenized milk, the particle size of the fat globules may vary, for example, from below 3 microns to 20 microns or more. Because the centrifugal separability of fat globules, the larger milkfat particles of unhomogenized dairy products are more readily separated, and an appropriate centrifugation technique may be used as a measure of milkfat globule particle size distribution in the cream cheese product.

The Mojonnier analytical procedure is a standard technique for milkfat analysis and is designated and described as AOAC test number 16.055. In order to centrifugally classify the milkfat constituents and apply the Mojonnier analytical procedure to the cream cheese sample, the curd component of the cream cheese product should be solubilized and the fat particles should be dispersed in a buffered, neutral pH solution without substantial aglommeration or diminution, so that centrifugal classification may be carried out. In order to provide a determination of centrifugally separable milkfat components, the following procedure was developed, and as used herein the term "centrifugally separable" in reference to a milkfat component refers to the milkfat separated and measured specifically in accordance with the following procedure:

A cream cheese sample, having a weight in the range of from 2 to 4 grams, is accurately weighed and placed in a 50 ml centrifuge tube. 5 ml of sodium phosphate buffer solution (pH 7.0) is added to the tube and stirred into a smooth slurry. An additional 20 ml of the same sodium phosphate (pH 7.0) buffer solution is then added to the tube, the tube is covered with a rubber stopper, and mixed for 30 seconds. The contents of the tube are then diluted with additional sodium phosphate (pH 7.0) buffer solution to provide a final volume of 50 ml in the tube. The centrifuge tube is then placed in a standard laboratory centrifuge (International Centrifuge Model EXD of International Equipment Co., Boston, Mass.) and centrifuged at 850 rpm for 10 minutes to bring a separable fat layer to the top of the tube. The tube is then placed in a freezer for 15 minutes to freeze the separated fat. The liquid is then removed from under the fat layer by suction pipet. The fat layer is then transferred to a standard Mojonnier flask with 2 to 3 portions of hot water (total—9 ml). The tube is rinsed with 3 portions of a 50—50 mixture of ethyl and petroleum ethers (total—10 ml) and the rinsings are added to the Mojonnier flask. The fat is then determined by standard Mojonnier method, AOAC #16.055.

The utilization of the pH 7.0 sodium phosphate buffer solution, and the specified centrifugation speed and centrifugation times for determining the centrifugally separable fat component as set forth herein are important parameters in the centrifugal classification technique, as the portion of milkfat separated by centrifugation will vary with varying centrifugation time and centrifugation speed, such that the particle size classification or separation capability will be varied. The specific classification capability used herein is determined by the specified parameters of this above-described test procedure.

Accordingly, it should be appreciated that in accordance with the present invention, soft bodied cream cheese products meeting the Federal Standards of Identity with respect to milkfat and moisture content are provided which are readily spreadable in bulk form at refrigeration temperatures and which may be packaged at elevated temperatures with provision of the soft bodied, spreadable character. It will also be appreciated that methods for manufacturing such products are provided in accordance with the invention which will provide for the effective and reliably controllable manufacture of such products.

While the present invention has been particularly described with specific reference to particular product and process embodiments, it will be appreciated that various alterations, modifications and adaptations may be made based on the present disclosure, and are intended to be within the spirit and scope of the present invention as defined by the following claims.

What is claimed is:

1. A soft bodied cream cheese product which is spreadable at refrigeration temperatures comprising a uniform blend of from about 25 percent to about 75 percent by weight based on the weight of said cream cheese product of a cultrued cream cheese dressing mix comprising at least about 30 percent by weight of substantially unhomogenized milkfat based on the weight of said dressing mix, at least about 40 percent by weight of total dairy solids, and not more than 60 percent moisture, based on the weight of said dressing mix, and from about 25 percent to about 75 percent by weight based on the weight of said cream cheese product of a firm bodied cream cheese curd from which whey has been separated and comprising at least about 30 percent by weight of homogenized milkfat, said homogenized milkfat having a particle size distribution which is smaller than that of said unhomogenized milkfat of said cultured cream cheese dressing mix, at least about 40 percent by weight of total dairy solids, and not more than about 60 percent by weight moisture based on the weight of said cultured cream cheese product, said cultured cream cheese dressing mix and said firm bodied cultured cream cheese curd product being present in said blend in proportion to provide said cream cheese product with a milkfat content of at least about 33 percent by weight having a broad or biomodal particle size distribution which is broader than the particle size distribution of either said unhomogenized milkfat or said homogenized milkfat, a moisture content not exceeding about 55 percent by weight based on the weight of said cream cheese product, and a Haake standard Jelly rotor initial yield value of less than about 2500 at refrigeration temperature of 45° F.

2. A soft bodied cream cheese product in accordance with claim 1 wherein said cultured cream cheese dressing mix component comprises at least about 33 weight percent milkfat and not more than aobut 55 weight percent moisture, and wherein said cultured cream cheese dressing mix and said firm bodied cream cheese curd are present in weight ratio of from about 1:2 to 2:1.

3. A soft bodied cream cheese product in accordance with claim 2 wherein said firm bodied cream cheese curd component comprises at least about 33 weight percent milkfat and not more than 55 percent moisture.

4. A soft bodied cream cheese product in accordance with claim 1 having a Haake initial yield at 45° F. of less than 2000.

* * * * *